W. L. ROHBOCK.
FASTENING DEVICE.
APPLICATION FILED FEB. 21, 1920.
1,352,918.
Patented Sept. 14, 1920.
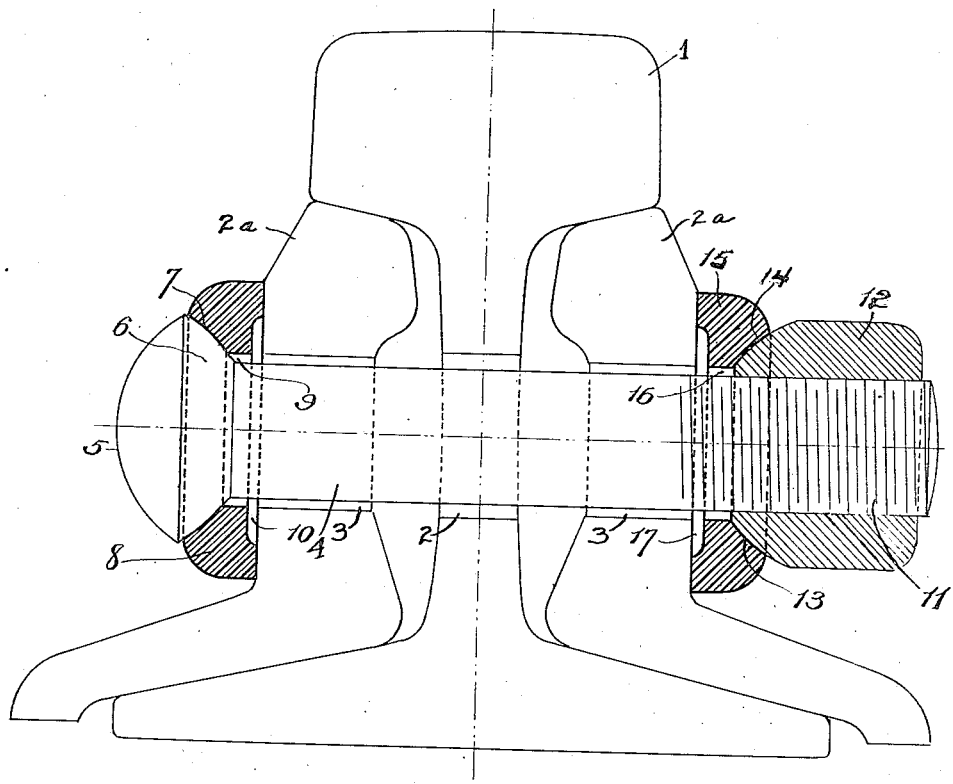
INVENTOR
W. L. Rohbock
BY
Seymour & Bright
ATTORNEYS.

UNITED STATES PATENT OFFICE.

WILLIAM L. ROHBOCK, OF CLEVELAND, OHIO.

FASTENING DEVICE.

1,352,918.   Specification of Letters Patent.   Patented Sept. 14, 1920.

Application filed February 21, 1920. Serial No. 360,291.

*To all whom it may concern:*

Be it known that I, WILLIAM L. ROHBOCK, a citizen of the United States, and a resident of Cleveland, in the county of Cuyahoga and State of Ohio, have invented certain new and useful Improvements in Fastening Devices; and I do hereby declare the following to be a full, clear, and exact description of the invention, such as will enable others skilled in the art to which it appertains to make and use the same.

This invention relates to improvements in fastening devices and more particularly to such as are adapted for use in railroad construction,—one object of the invention being to so construct fastening means as to provide compensation for or absorption of vibration of the parts held by said fastening means and thus reduce liability of the latter becoming loose.

A further object is to provide fastening means wherein a flexible and a resilient connection shall be afforded between the headed ends of a bolt and the parts which said bolt holds in place.

With these and other objects in view, the invention consists in certain novel features of construction and combinations of parts as hereinafter set forth and pointed out in the claims.

The accompanying drawing is a sectional view in which an embodiment of my invention is illustrated.

It is well known that the passage of a train over a railroad track causes considerable pounding and resultant vibration of the rails and their connecting devices, thus resulting in a tendency to loosen the securing means when the latter include in their structure, threaded parts. It is the aim of my invention to reduce to a minimum such loosening tendency. In the drawing I have shown and will describe my invention as the same may be employed for securing splice-bars or fish-plates to a rail, but it will be understood that my improvements may be otherwise applied in any form of construction.

1 represents a railroad rail having an opening 2 in its web and 2ª, 2ª, illustrate splice-bars or fish-plates having openings 3 therein which aline with the opening 2 in the web of the rail,—said openings 2—3 being intended for the accomodation of a transversely disposed bolt 4. In the present construction the diameter of the bolt is appreciably less than that of the openings 2—3 in the rail-web and fish-plates so that said bolt is capable of slight play. One end of the bolt 4 is provided with a head 5, a portion 6 of which is so curved as to be partly spherical and has a bearing on a concaved seat 7 formed in a seat-plate 8. This seat-plate, disposed between the head 5 of the bolt and the adjacent fish-plate, may have any desired external configuration and it is made with an opening 9 for the accomodation of the neck of the bolt and on its inner side it is recessed as at 10. The seat-plate 7 is preferably made of steel and when constructed as above described it will be more or less flexible when in use.

That portion of the body of the bolt farthest removed from the headed end thereof is threaded as at 11 to receive an internally threaded nut or removable head 12. This nut or head 12 is made with a partly spherical portion 13 which engages the curved seat 14 in a seat-plate 15 disposed between said nut or head and the adjacent fish-plate,—the said seat-plate 15 having an opening 16 for the bolt and having a recessed portion 17 in its inner face.

The seat-plates 8 and 15 may be identical in construction and the openings therein through which the bolt passes are appreciably greater in diameter than the diameter of the bolt.

It will be observed that both heads on the bolt are movably mounted in seat-plates disposed between said heads and the parts to be fastened and that therefore flexible connections are provided between the ends of the bolt and the devices which said bolt hold in place. These flexible connections, together with the resilience of the seat-plates will serve to compensate for and, in effect, absorb the vibration to which the fastening devices may be subjected and thus reduce liability of the threaded nut or head 12 becoming loose and also have a tendency to prevent crystallization of the bolt.

Having fully described my invention what I claim as new and desire to secure by Letters-Patent, is:

1. Fastening means comprising a bolt threaded at one end and provided at its other end with a head having a partly spherical portion, a head on the threaded end of the bolt having a partly spherical portion, and resilient seat-plates having curved seats in which the spherical portions of said heads are movably mounted.

2. Fastening means comprising a bolt provided with a head having a partly spherical portion, and a seat-plate of resilient material having a curved seat on which the partly spherical portion of the bolt head is movably mounted, said seat-plate having a recessed inner face and having an opening for the bolt which is appreciably greater than the diameter of the bolt.

3. Fastening means comprising a bolt, a nut thereon, a rounded portion constituting an extension of said nut, and a resilient plate having a rounded seat to receive the rounded extension on the nut.

In testimony whereof, I have signed this specification in the presence of two subscribing witnesses.

WILLIAM L. ROHBOCK.

Witnesses:
E. LAVELLE,
L. D. HENDERSON.